US012621465B2

(12) United States Patent
Xu et al.

(10) Patent No.: US 12,621,465 B2
(45) Date of Patent: May 5, 2026

(54) METHODS FOR LOSSLESS ARGB (ALPHA, RED, GREEN, BLUE) COMPRESSION BASED ON INTRA-BLOCK PREDICTIONS

(71) Applicants: ZHEJIANG UNIVERSITY, Hangzhou (CN); BEIJING SMARTCHIP MICROELECTRONICS TECHNOLOGY CO., LTD., Beijing (CN)

(72) Inventors: Kai Xu, Hangzhou (CN); Bo Wu, Beijing (CN); Chenggang Xu, Hangzhou (CN); Yanning Chen, Beijing (CN); Fang Liu, Beijing (CN); Dawei Gao, Hangzhou (CN); Yongyu Wu, Hangzhou (CN)

(73) Assignees: ZHEJIANG UNIVERSITY, Hangzhou (CN); BEIJING SMARTCHIP MICROELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/926,354

(22) Filed: Oct. 25, 2024

(65) Prior Publication Data

US 2025/0056011 A1     Feb. 13, 2025

(30) Foreign Application Priority Data

Nov. 30, 2023     (CN) .......................... 202311625342.8

(51) Int. Cl.
*H04N 19/593* (2014.01)
*H04N 19/159* (2014.01)
(Continued)

(52) U.S. Cl.
CPC ......... *H04N 19/159* (2014.11); *H04N 19/176* (2014.11); *H04N 19/186* (2014.11); *H04N 19/91* (2014.11)

(58) Field of Classification Search
CPC .. H04N 19/159; H04N 19/176; H04N 19/186; H04N 19/91
(Continued)

(56) References Cited

U.S. PATENT DOCUMENTS 11,025,903 B2 * 6/2021 Zhang ................... H04N 19/103
12,149,736 B2 * 11/2024 Choe .................... H04N 19/186
(Continued)

FOREIGN PATENT DOCUMENTS

WO     WO-2020094706 A1 * 5/2020 ........... H04N 19/176

*Primary Examiner* — Albert Kir
(74) *Attorney, Agent, or Firm* — PORUS IP LLC

(57) ABSTRACT

A method for lossless ARGB (Alpha, Red, Green, Blue) compression based on an intra-block prediction is provided. The method is executed by a processor, and the method comprises for an input image block under a processing channel, executing the following operations until all input image blocks are encoded: obtaining a predicted value of the input image block under a current processing channel based on the input image block under the current processing channel by the intra-block prediction; determining predicted residuals of the input image block under the current processing channel based on the predicted value and an original pixel value; inputting the predicted residuals into a residual encoder for encoding to obtain a residual stream of the input image block under the current processing channel; and storing residual streams of all input image blocks of all processing channels as a compressed file in a storage file.

11 Claims, 8 Drawing Sheets

☐ Original pixel value, no predicting
▷ Differential pulse code modulation (DPCM) prediction in horizontal or vertical direction
■ Median edge detector (MED) prediction

(51) Int. Cl.
    *H04N 19/176*       (2014.01)
    *H04N 19/186*       (2014.01)
    *H04N 19/91*        (2014.01)

(58) Field of Classification Search
    USPC ..................................................... 375/240.12
    See application file for complete search history.

(56)                 References Cited

U.S. PATENT DOCUMENTS

2010/0232722 A1*   9/2010   Park ........................ H03M 7/40
                                      382/239
2015/0201201 A1*   7/2015   Cheong .................. H04N 19/11
                                      382/166
2016/0360205 A1*  12/2016   Chang .................. H04N 19/182
2020/0099925 A1*   3/2020   Lee ...................... H04N 19/105

* cited by examiner

Image block compression

Original pixel value, no predicting

Differential pulse code modulation (DPCM) prediction
in horizontal or vertical direction Median edge detector (MED) prediction

| c | b |
|---|---|
| a | x |

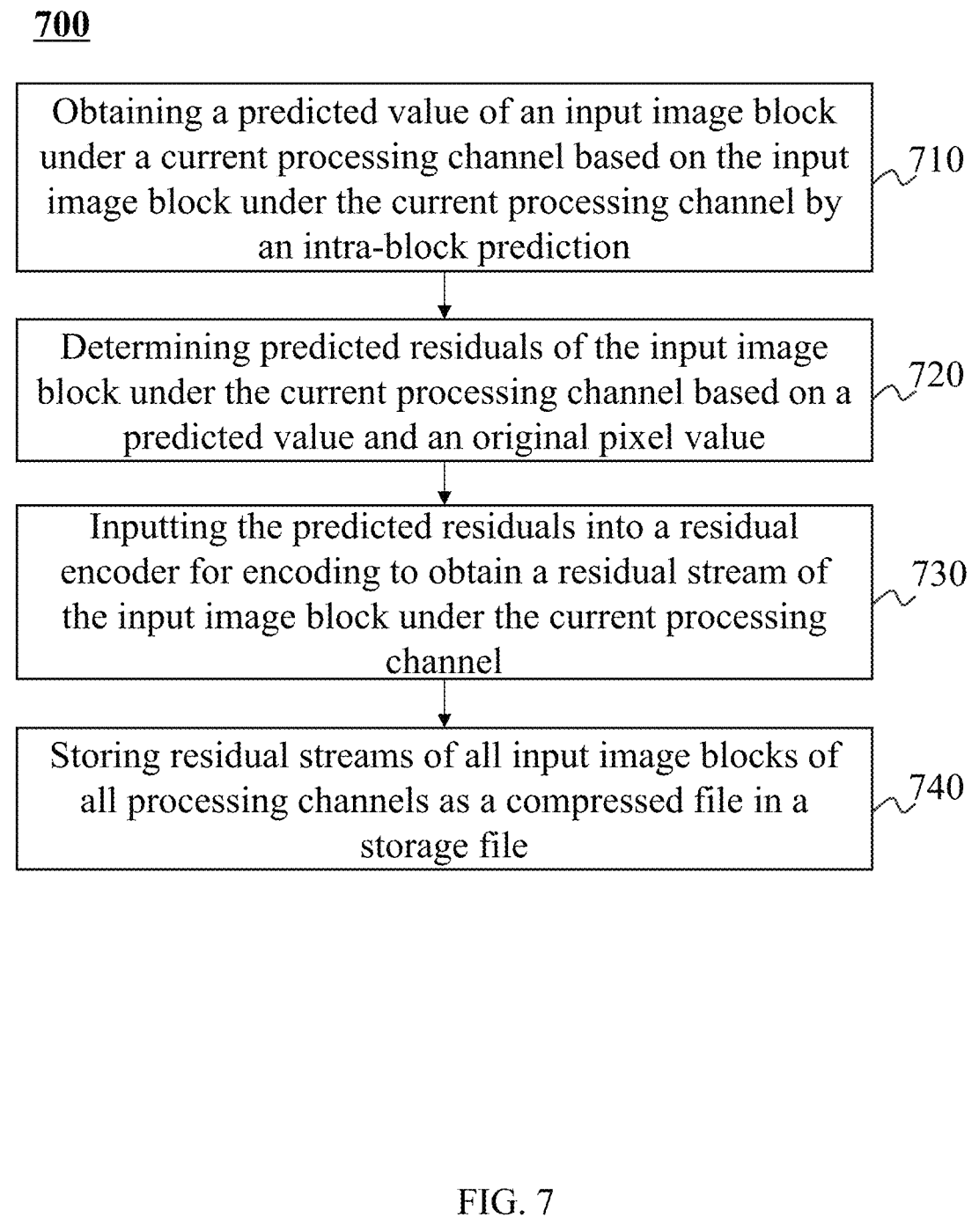

Obtaining a predicted value of an input image block under a current processing channel based on the input image block under the current processing channel by an intra-block prediction ~710

Determining predicted residuals of the input image block under the current processing channel based on a predicted value and an original pixel value ~720

Inputting the predicted residuals into a residual encoder for encoding to obtain a residual stream of the input image block under the current processing channel ~730

Storing residual streams of all input image blocks of all processing channels as a compressed file in a storage file ~740

FIG. 7

METHODS FOR LOSSLESS ARGB (ALPHA, RED, GREEN, BLUE) COMPRESSION BASED ON INTRA-BLOCK PREDICTIONS

CROSS-REFERENCE TO RELATED APPLICATIONS

The application claims priority to Chinese Application No. 202311625342.8, filed Nov. 30, 2023, the entire contents of which are hereby incorporated by reference.

TECHNICAL FIELD

The present disclosure relates to the field of data compression technology, and in particular, to methods for lossless ARGB (Alpha, Red, Green, Blue) compression based on intra-block predictions.

BACKGROUND

In a graphics processing unit (GPU), a display control unit, a depth unit, and a texture unit are required to process image data in real-time. Additionally, a reference frame storage unit in a video codec (VC) of a variety of video codec protocols (e.g., HEVC, H.264/AVC, and MPEG-2) is required to store the image data of the reference frame. Currently, mainstream display resolutions include full high definition (FHD) and quarter high definition (QHD), with high-end displays reaching 4K ultra high definition (UHD) and 8K UHD. A higher resolution means a higher size of storage data, and due to the size limitations of the on-chip cache in the GPU and the VC, the image data is stored off-chip in double data rate synchronous dynamic random access memory (DDR SDRAM). As a result, all of the above units require frequent reads of the storage unit DDR as well as writing large amounts of data. The DDR needs to respond on time to data access requests from these units. When reading and writing a large amount of data from the reference frame, the bandwidth of the DDR cannot satisfy the real-time reading demand, and the operation of reading and writing a large amount of data at the same time may significantly increase the power consumption of the system.

Image block compression is currently the main solution for storage access bandwidth. By employing an image block compression and decompression module to compress the image block before it is to be deposited into the DDR, the amount of data that needs to be read and written is reduced, thus reducing the requirement for the access bandwidth of the DDR. Fast processing speed and high data throughput of the image block compression and decompression module are required for the GPU and the VC to reduce the impact on the image processing of the GPU and the VC. Thus, algorithm complexity needs to be considered when designing an image block compression and decompression algorithm. The higher algorithm complexity produces higher latency in the compression and decompression process.

Therefore, a method for lossless ARGB compression based on an intra-block prediction is provided so that the amount of data stored in the image block can be greatly reduced. At the same time, the prediction manner and the residual grouping manner in the compression of image blocks are improved to improve the prediction performance and the grouping efficiency.

SUMMARY

One or more embodiments of the present disclosure provide a method for lossless ARGB (Alpha, Red, Green, Blue) compression based on an intra-block prediction. The method may be executed by a processor, and the method may comprise: for an input image block under a processing channel, executing the following operations until all input image blocks are encoded: obtaining a predicted value of the input image block under a current processing channel based on the input image block under the current processing channel by the intra-block prediction; determining predicted residuals of the input image block under the current processing channel based on the predicted value and an original pixel value; inputting the predicted residuals into a residual encoder for encoding to obtain a residual stream of the input image block under the current processing channel, the residual encoder being a processor including a predetermined encoding program; and storing residual streams of all input image blocks of all processing channels as a compressed file in a storage file.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein:

FIG. 5 is a schematic diagram illustrating a prediction model according to some embodiments of the present disclosure;

FIG. 7 is a flowchart illustrating an exemplary method for lossless ARGB compression based on an intra-block prediction according to some embodiments of the present disclosure.

DETAILED DESCRIPTION

Figure 1:
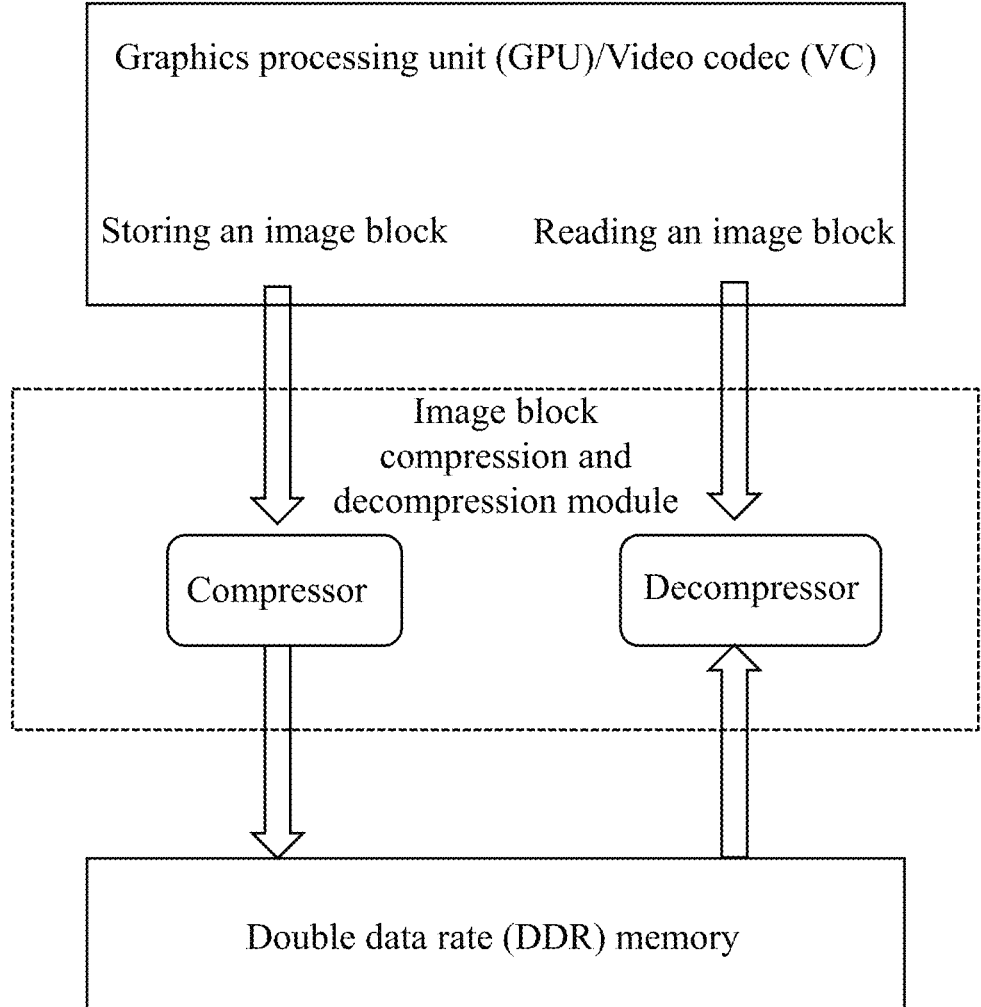
FIG. 1 is a schematic diagram illustrating an exemplary graphics processing unit (GPU) or video codec (VC) interacting with a double data rate (DDR) memory according to some embodiments of the present disclosure.

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit" and/or "module" as used herein is a manner used to distinguish different components, elements, parts, sections, or assemblies at different levels. However, if other words serve the same purpose, the words may be replaced by other expressions.

As shown in the present disclosure and claims, the words "one", "a", "a kind" and/or "the" are not especially singular but may include the plural unless the context expressly suggests otherwise. In general, the terms "comprise", "comprises", "comprising", "include", "includes", and/or "including", merely prompt to include operations and elements that have been clearly identified, and these operations and elements do not constitute an exclusive listing. The methods or devices may also include other operations or elements.

The flowcharts used in the present disclosure illustrate operations that systems implement according to some embodiments of the present disclosure. It should be understood that the previous or subsequent operations may not be accurately implemented in order. Instead, each step may be processed in reverse order or simultaneously. Meanwhile, other operations may also be added to these processes, or a certain step or several steps may be removed from these processes.

Figure 2:
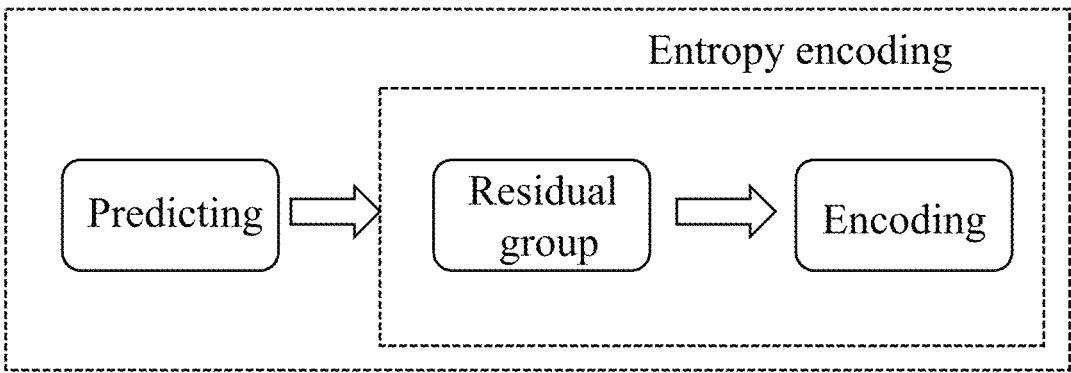
FIG. 2 is a schematic diagram illustrating an exemplary method for compressing image blocks according to some embodiments of the present disclosure.

FIG. 1 is a schematic diagram illustrating an exemplary graphics processing unit (GPU) or video codec (VC) interacting with a double data rate (DDR) memory according to some embodiments of the present disclosure. FIG. 2 is a schematic diagram illustrating an exemplary method for compressing image blocks according to some embodiments of the present disclosure.

As shown in FIG. 1, an image block compression and decompression module mainly include a compressor and a decompressor. The GPU or VC generates image block data, which is deposited into the memory after passing through the compressor. When the GPU or VC needs the image block data, compressed data in the DDR memory needs to be decompressed by the decompressor and transferred to the GPU and the VC.

The existing image block compression algorithms are divided into two main steps, prediction and entropy encoding. The entropy encoding is divided into residual grouping and encoding, as shown in FIG. 2. the prediction manner is mostly taken as a differential pulse code modulation (DPCM) prediction and a mean prediction, along with N*N grouping and a semi-fixed-length entropy encoding algorithm. The above prediction manners may predict each pixel point well when the image block is smooth, but the prediction effect is poor when encountering a texture-rich image block. Meanwhile, the N*N grouping manner of residuals is not the most efficient grouping manner.

The present disclosure is further described below in connection with the drawings and embodiments.

Figure 3:
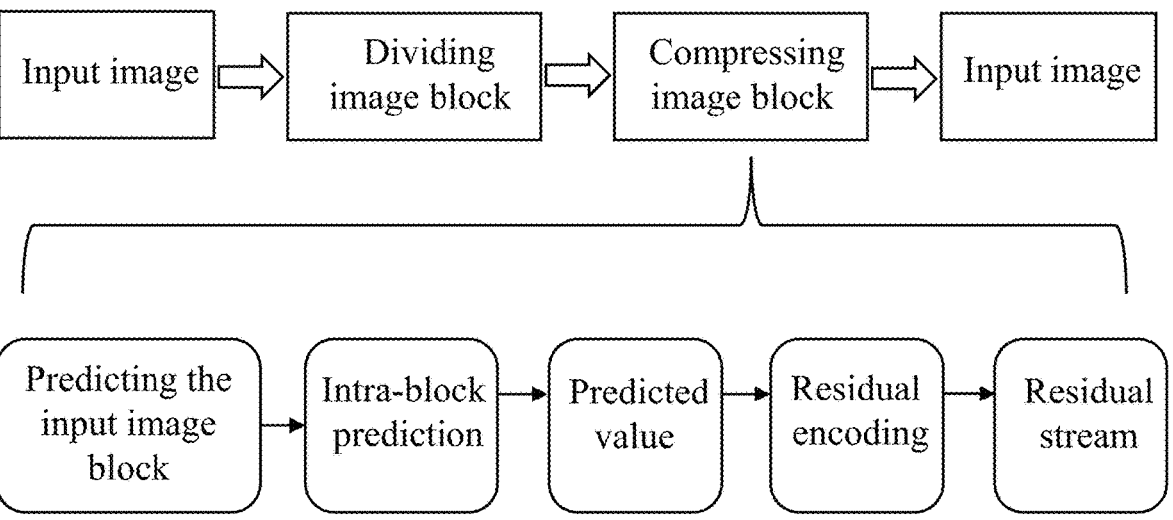
FIG. 3 is a schematic diagram illustrating an exemplary method for lossless ARGB compression based on an intra-block prediction according to some embodiments of the present disclosure.
Figure 4:
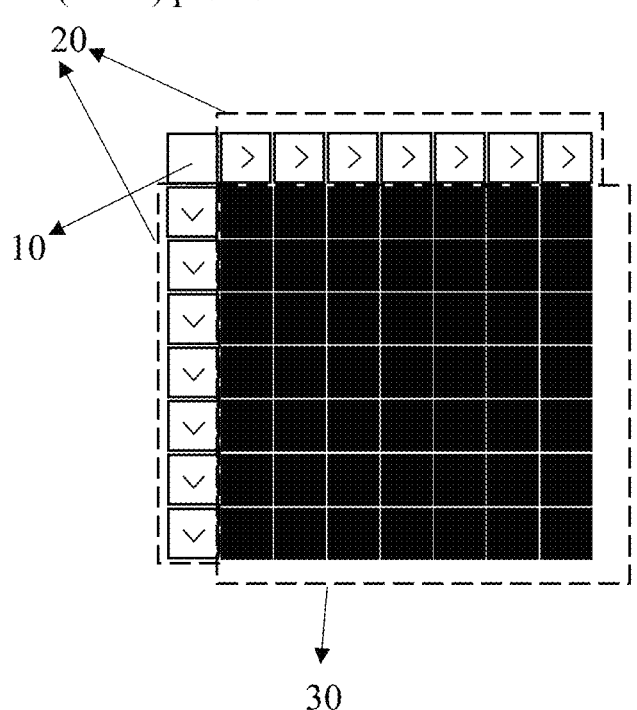
FIG. 4 is a schematic diagram illustrating an intra-block prediction model according to some embodiments of the present disclosure.

FIG. 3 is a schematic diagram illustrating an exemplary method for lossless ARGB compression based on an intra-block prediction according to some embodiments of the present disclosure. FIG. 4 is a schematic diagram illustrating an intra-block prediction model according to some embodiments of the present disclosure.

The embodiment of the present disclosure first divides an input ARGB image into image blocks of 8*8 size, obtains a plurality of corresponding image blocks, and predicts and encodes each of the image blocks separately. The prediction coding process of an image block is as follows. Firstly, four channels of the input image block are predicted by the intra-block prediction, and a predicted value is obtained.

Then, an original pixel value is subtracted from the predicted value to obtain a predicted residual. Finally, the predicted residual is provided to a residual encoder and is encoded by using small value optimized variable length coding (SVO-VLC) to obtain a residual stream corresponding to the image block, i.e., the encoding of the current image block is completed. Further, this process is repeated for each ARGB channel until the encoding of all image blocks is completed, as shown in FIG. 3.

In some embodiments, for the intra-block prediction, as shown in FIG. 4, each image block is divided into 3 parts. A first part is original pixel values in the upper left corner, which are not involved in encoding. A second part is the part of pixels in the first row and the first column, excluding the upper left corner. A third part is all the pixels excluding the elements of the first part and the second part, and different prediction manners are applied to these three parts of the pixels.

FIG. 5 is a schematic diagram illustrating a prediction model according to some embodiments of the present disclosure.

DPCM processes image pixels one by one in a certain order in a string, which only eliminates spatial redundancy in one direction. For an actual two-dimensional image, DPCM does not fully utilize spatial redundancy. Therefore, this embodiment uses a manner combining a DPCM prediction and a median edge detector (MED) prediction for predicting. The DPCM prediction is used for a first row and a first column of the image block, i.e., a previous pixel is copied sequentially. The MED prediction is used for the region after removing the first row and the first column of the image block, as shown in FIG. 5, and the predicted value of the pixel is calculated according to an equation (1). Using DPCM prediction in combination with MED prediction, redundant information of the image block in two directions may be utilized to achieve better compression. The equation (1) is shown below.

$$x = \begin{cases} \min(a, b), c \geq \max(a, b) \\ \max(a, b), c \leq \min(a, b) \\ a + b - c, \text{ otherwise} \end{cases} \tag{1}$$

Where a denotes a left reference pixel, b denotes a top reference pixel, c denotes a top left reference pixel, and x denotes a predicted pixel.

Figure 6:
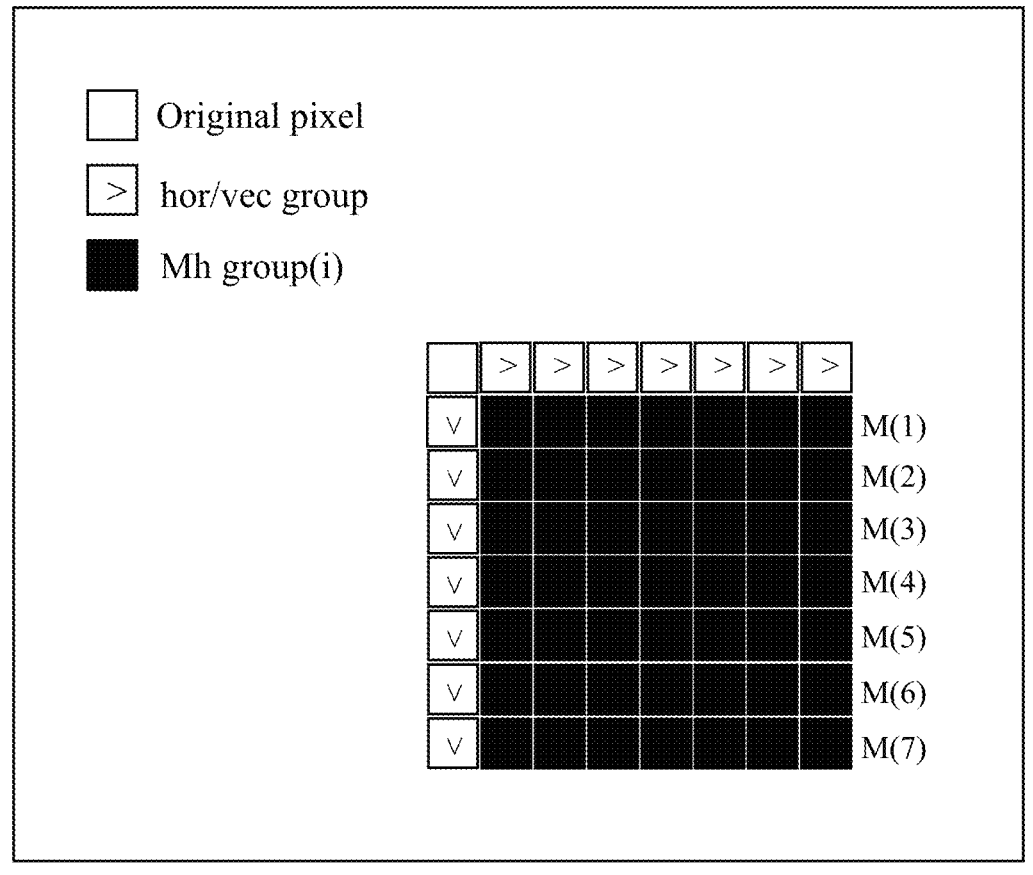
FIG. 6 is a schematic diagram illustrating an exemplary residual grouping according to some embodiments of the present disclosure.

FIG. 6 is a schematic diagram illustrating an exemplary residual grouping according to some embodiments of the present disclosure.

In some embodiments, for the residual grouping, since a spatial correlation in a horizontal direction is stronger than a correlation in a vertical direction, the residual grouping combines residuals that are similarly distributed in the horizontal direction into one group, which may make full use of the compression potential of the image data. The residuals are grouped into 9 groups, as shown in FIG. 6.

In some embodiments, for variable length encoding, residual encoding may be performed after the residual grouping is completed. For entropy encoding process, an SVO-VLC code table shown in table 1 is used, which utilizes the encoding potential of a small-value residual block.

For the same residual group, a header for that residual group is selected based on a maximum absolute value of each encoding unit. A special encoding strategy is adopted when the residuals of the encoding unit are all 0 or the maximum value of the residuals is greater than 31. The former is coded only for the header, and the latter is directly output for an original pixel value.

When the header is determined, the encoding is performed in a fixed-length manner.

The SVO-VLC table list is shown below:

| | 01 | 10 | 110 | 1110 | 11110 Max | 111110 | 111111 |
| --- | --- | --- | --- | --- | --- | --- | --- |
| | 0 | 1 | 2-3 | 4-7 | 8-15 | 16-31 | >31 |
| 0 | — | 10 | 001 | 0001 | 00001 | 000001 | |
| ±1 | | 0S | 01S | 001S | 0001S | 00001S | |
| ±2 | | | 10S | 010S | 0010S | 00010S | |
| ±3 | | | 11S | 011S | 0011S | 00011S | |
| ... | | | | ... | ... | ... | |
| ±7 | | | | 111S | 0111S | 00111S | |
| ±8 | | | | | 1000S | 01000S | |
| ... | | | | | ... | ... | xxx . . . xx |
| ±11 | | | | | 1011S | 01011S | |
| ±12 | | | | | 1100S | 01100S | |
| ... | | | | | ... | ... | |
| ±15 | | | | | 1111S | 01111S | |
| ±16 | | | | | | 10000S | |
| ... | | | | | | ... | |
| ±31 | | | | | | 11111S | |

S denotes a sign bit (0 for positive, 1 for negative)

The foregoing is a preferred embodiment of the present disclosure. It should be pointed out that, for a person of ordinary skill in the art, a number of improvements and embellishments may be made without departing from the principles of the present disclosure, these improvements and embellishments are also regarded as the scope of protection of the present disclosure.

The present disclosure includes but are not limited to the following beneficial effects. First, the combination of the DPCM prediction and the MED prediction may utilize the redundant information of the image in two directions to achieve better compression. Second, the edges and horizontal direction residual grouping may fully utilize the compression potential of the image data.

According to some embodiments of the present disclosure, a method for lossless ARGB compression based on an intra-block prediction is provided. The method is executed by a processor, and the method includes, for an input image block under a processing channel, executing the following operations until all input image blocks are encoded: obtaining a predicted value of the input image block under a current processing channel based on the input image block under the current processing channel by the intra-block prediction; determining predicted residuals of the input image block under the current processing channel based on the predicted value and an original pixel value; inputting the predicted residuals into a residual encoder for encoding to obtain a residual stream of the input image block under the current processing channel; and storing residual streams of all input image blocks of all processing channels as a compressed file in a storage file.

The intra-block prediction is a prediction manner where the image is divided into a plurality of chunks, and an independent prediction is made for each chunk, thus reducing redundant information. The ARGB compression refers to the processing of an image through ARGB channels. The ARGB channels include an alpha channel (A channel), a red channel (R channel), a green channel (G channel), and a blue channel (B channel).

In some embodiments, the processor is configured to process information and/or data related to the method for lossless ARGB compression based on the intra-block prediction to perform one or more functions described in the application. In some embodiments, the processor may include one or a combination of a plurality of a microcontroller (MCU), an embedded processor, a graphics processing unit (GPU), or the like.

FIG. 7 is a flowchart illustrating an exemplary method for lossless ARGB compression based on an intra-block prediction according to some embodiments of the present disclosure.

In some embodiments, the processor may be configured to perform process 700, as shown in FIG. 7. The process 700 is an exemplary process of the method for lossless ARGB compression based on the intra-block prediction. The process 700 includes steps 710-740, and the processor may be configured to perform the steps 710-740 for each input image block under each processing channel until all input image blocks are complete encoded and perform step 740 based on the results of the above steps. Steps 710-740 are shown below.

In 710, a predicted value of the input image block is obtained under a current processing channel based on the input image block under the current processing channel by the intra-block prediction.

The input image block refers to an image that includes a part of the input image. The input image refers to a target image to be compressed.

In some embodiments, the processor may determine at least one input image block based on the input image.

For example, the processor may divide the input image according to a preset shape to determine at least one input image block. The preset shape may be a regular shape or an irregular shape. The preset shape may be set according to the demand. For example, the preset shape may be a rectangle of $n \times m$, or the like. Where n and m denote pixel values, and values of n and m may be equal or unequal.

As another example, the processor may divide the input image by a preset number. The preset number is related to image complexity. The more complex the input image, the larger the preset number. The image complexity is used to indicate the complexity of the input image. The image complexity may be expressed as the number of colors in the input image. The more colors in the input image, the higher the image complexity. The number of colors may be obtained from a color histogram, a number of discrete colors, or other color quantization manners.

In some embodiments, the input image may be obtained based on a user terminal. The user terminal refers to a terminal server used by a user, e.g., a mobile phone, a personal computer, a tablet, or the like. The processor may obtain the input image uploaded by the user based on the user terminal.

In some embodiments, the input image block is determined based on the input image, the input image is an ARGB image. In some embodiments, the input image block is obtained by dividing the ARGB image into 8*8 sized image blocks. Where 8 indicates that the number of pixels is 8.

The ARGB image is an image format that includes ARGB components. The ARGB components include a transparency, an intensity of a red component, an intensity of a green component, and an intensity of a blue component.

In some embodiments, the processor may divide the ARGB image into 8*8 sized image blocks to obtain at least one input image block, and each input image block is the ARGB image.

In some embodiments, the processor may also determine at least one input image block by determining whether a first edge feature or a second edge feature exists in the input image. More detailed descriptions may be found in related descriptions hereinafter.

The processing channel refers to a channel that process different parameters of an image. In some embodiments, the processing channel may be ARGB channels, including an A channel, an R channel, a G channel, and a B channel. More detailed descriptions regarding the ARGB channels may be found in related descriptions hereinabove. The current processing channel refers to one of the processing channels currently used to process the image.

The intra-block prediction is a manner that performs pixel prediction separately for each input image block. More detailed descriptions regarding the intra-block prediction may be found in the related descriptions hereinabove.

In some embodiments, the intra-block prediction includes a prediction by dividing the input image block into three parts.

In some embodiments, the processor may randomly divide the input image block into three parts for prediction. In some embodiments, the processor may divide the input image block into three parts for prediction according to a preset size. The preset size may be predetermined according to demand.

Exemplarily, as shown in FIG. 4, a first part 10 of the input image block includes original pixels in the upper left corner, a second part 20 includes pixels in a first row and a first column excluding the original pixels in the upper left corner, and a third part 30 includes the remaining pixels in the input image block excluding the first part and the second part.

The accuracy of the pixel prediction of the input image block may be improved by further dividing the input image block.

In some embodiments, the input image block includes at least one row pixel group and at least one column pixel group. The processor may determine a similarity set and divide the input image block into three parts based on the similarity set.

The row pixel group refers to a collection of pixel values for a row in the input image block. The row pixel group may be represented as a vector ensemble. Exemplarily, the row pixel group may be represented as $(a_{11}, a_{12}, a_{13} \ldots a_{1y})$, $(a_{21}, a_{22}, a_{23} \ldots a_{2y})$, . . . , $(a_{x1}, a_{x2}, a_{x3} \ldots a_{xy})$, where, $a_{xy}$ indicates the pixel value in row x and column y.

The column pixel group refers to a collection of pixel values of a column in the input image block. The column pixel group may be represented as a vector. Exemplarily, the total number of rows of pixels in the input image block is x, the total number of columns is y, and the column pixel group may be represented as $(a_{11}, a_{21}, a_{31} \ldots a_{x1})$, $(a_{12}, a_{22}, a_{32} \ldots a_{x2})$, . . . , $(a_{1y}, a_{2y}, a_{3y} \ldots a_{xy})$.

The similarity set refers to an ensemble representing the similarity of rows and columns of the input image block. In some embodiments, the similarity set includes similarities of the at least one row pixel group and the at least one column pixel group of the input image block. The similarity set also includes a label corresponding to the similarity. The similarity set may be represented as a vector ensemble. Exemplarily, the similarity set may be represented as [(0.4, 1, 2), (0.3, 1, 3), or the like]. The similarity is 0.4 in (0.4, 1, 2), the label is (1, 2), and (0.4, 1, 2) indicates that the similarity between the first row and the second column is 0.4. The similarity in (0.3, 1, 3) is 0.3, the label is (1, 3), and (0.3, 1, 3) indicates that the similarity between the first row and the third column is 0.3.

In some embodiments, the processor may compute a similarity between the row pixel group and the column pixel group, and take the similarity, a row label of the row pixel group, and a column label of the column pixel group as the similarity set. The similarity is negatively correlated with a vector distance between a row vector and a column vector. The row vector refers to a vector corresponding to a row in the row pixel group. The column vector refers to a vector corresponding to a column in the column pixel group. The vector distance may be expressed as a cosine distance or a Euclidean distance.

In some embodiments, the processor may group the input image block based on the similarity set through a variety of manners.

For example, the processor may select a row and column of the input image block that have the highest similarity in the similarity set, take intersection pixels as a first part, take the remaining pixels in the same row and column as a second part, and take pixels in the input image block excluding the first part and the second part as a third part.

Exemplarily, the row and column of the highest similarity in the similarity set is (0.4, 1, 2), that means the similarity between the first row and the second column is the highest. The intersection pixel of the first row and the second column is $a_{12}$, then $a_{12}$ is used as the first part, and pixels in the first row and the second column excluding $a_{12}$ are used as the second part, and the other pixels excluding the pixels in the first part and the second part are used as the third part.

Grouping by the similarity between rows and columns of the input image block may make the obtained group more reasonable, which makes the subsequent prediction more accurate.

The predicted value of the input image block refers to a pixel value of the input image obtained by prediction.

In some embodiments, the processor may predict, based on the input image block under the current processing channel, to obtain the predicted value of the input image block under the current processing channel through various manners.

For example, for each input image block under the current processing channel, the processor may separately predict to obtain the predicted value of the input image block under the current processing channel by a preset algorithm. The preset algorithm may be at least one of a differential pulse code modulation (DPCM) algorithm, a median edge detector (MED) algorithm, other pixel prediction algorithms, or the like.

In some embodiments, the processor may predict each of the three parts of the input image block, and the pixel values obtained from the prediction of the three parts of the input image block are used as the predicted values of the input image block. For each part of the input image block, at least one prediction algorithm is used, or the original pixel value is retained. The prediction algorithms may be the same or different for each part.

Exemplarily, as shown in FIG. 4, an input image block includes the first part 10, the second part 20, and the third part 30. The processor may retain the original pixel value of the first part 10. The processor may apply a DPCM algorithm to the second part 20 for prediction and designate a plurality of predicted pixel values as first predicted values. The processor may apply the MED algorithm to the third part 30 for prediction and designate a plurality of pixel values as second predicted values. The processor may output the original pixel value of the first part, the first predicted values of the second part, and the second predicted values of the third part as the predicted values of the input image block. More detailed descriptions may be found in FIG. 4 and the related descriptions.

In some embodiments, the processor may perform a differential pulse code modulation (DPCM) prediction on a first row and a first column of the input image block and perform a median edge detector (MED) prediction on a region of the input image block after removing the first row and the first column. More detailed descriptions may be found in FIG. 5 and related descriptions thereof.

In some embodiments, the processor may use a plurality of pixel values obtained by prediction using the DPCM algorithm and the MED algorithm as the predicted values of the input image block.

The DPCM algorithm is simple but sensitive to noise, which may cause error accumulation. The MED algorithm has high accuracy and good noise suppression but high computational complexity. Using a combination of the DPCM algorithm and the MED algorithm, the compression effect of the image may be better by utilizing the redundant information of the image in two directions.

In some embodiments, the processor may also determine a second pixel value of the input image block based on a first pixel value sequence of the input image block. The first pixel value sequence refers to a sequence consisting of actual pixel values that lie within a predetermined range of the second pixel value. The second pixel value is a predicted value of a pixel of the input image block currently predicted. More detailed descriptions may be found in FIG. 8 and related descriptions thereof.

In 720, predicted residuals of the input image block are determined under the current processing channel based on the predicted value and the original pixel value.

The original pixel value refers to a true pixel value of the input image block obtained by measuring. In some embodiments, the processor may obtain an image uploaded by a user based on a user terminal that contains the original pixel value and extract the original pixel value in the image. The user terminal may be a terminal device such as a mobile phone, a personal computer, a tablet computer, or the like.

The predicted residuals are used to indicate a difference between the predicted value of a pixel and the original pixel value of the input image block.

In some embodiments, the processor may determine, based on the predicted value and the original pixel value, the predicted residuals of the input image block under the current processing channel through a plurality of manners.

For example, the processor may use the absolute value of the difference between the original pixel value and the predicted value as the predicted residual.

In 730, the predicted residuals are input into a residual encoder for encoding to obtain a residual stream of the input image block under the current processing channel.

The residual encoder refers to a processor including a predetermined encoding program. The residual encoder may be configured as at least one of a digital signal processor (DSP), an image processing unit (IPU), a central processing unit (CPU), or the like. The predetermined encoding program refers to a predetermined program for encoding the predicted residuals. For example, the predetermined encoding program may be a program that encodes the predicted residuals using small value optimized variable length encoding.

The residual stream refers to a bit stream formed by encoding the predicted residuals of the input image block.

By encoding the predicted residuals into a code stream, the amount of data may be effectively reduced, thereby saving storage space and transmission bandwidth. When decoding, the original image may be recovered by decoding the residual stream and combining the predicted value.

In some embodiments, the processor may input the predicted residuals into the residual encoder, which encodes them through a variety of manners to obtain the residual stream of the input image block under the current processing channel. For example, the processor may use the small value optimized variable length encoding to encode the predicted residuals.

In some embodiments, the processor may also encode the predicted residuals based on other manners, such as Huffman coding, arithmetic coding, or the like.

In some embodiments, the processor may group the predicted residuals of the input image block. For example, the processor may randomly group the predicted residuals. A count of groups may be set as desired. As another example, the processor may take the predicted residuals corresponding to each row of pixels of the input image block under the current processing channel as a residual group. As yet another example, the processor may take the predicted residuals corresponding to each column of pixels of the input image block under the current processing channel as a residual group. The residual group refers to an ensemble consisting of a plurality of predicted residuals.

Grouping the predicted residuals may increase the accuracy of subsequent encoding.

In some embodiments, the processor may obtain at least one residual group by grouping the predicted residuals based on a predetermined condition.

The predetermined condition may be set based on demand or experience. The predetermined condition may include that predicted residuals in the same column or row that are less than a preset threshold are used as a residual group and predicted residuals in the same column or row that are greater than or equal to the preset threshold are used as a residual group. Exemplarily, the predetermined condition is that the distribution is similar in the horizontal direction, i.e., the predicted residuals in the horizontal direction are less than the preset threshold. The preset threshold may be set according to experience.

In some embodiments, for the same residual group, the processor may determine a header of the residual group based on a maximum absolute value of the residual group.

The encoding unit refers to the smallest unit used for encoding. The residual group refers to a collection of at least one predicted residual corresponding to the same input image block. The header is a symbol or code used to determine an encoding group of the residual group in an encoding table. The encoding table is a table including an encoding rule. Exemplarily, the encoding table may be an SVO-VLC code table. The same predicted residual is encoded differently under different headers. In some embodiments, the processor may divide the maximum absolute value into different predetermined ranges, with each predetermined range corresponding to a header. Exemplarily, as shown in the SVO-VLC code table, the predetermined range may include 0, 1, 2-3, 4-7, 8-15, 16-31, or greater than 31, with corresponding headers including 01, 10, 110, 1110, 11110, 111110, or 111111. Header 110 represents that the maximum absolute value of the encoding unit is within a range of 2-3. If the maximum absolute value of predicted residuals in a residual group is 2 or 3, all predicted residuals in the residual group correspond to codes under a column with header 110. More detailed descriptions regarding SVO-VLC code table may be found in related descriptions hereinabove.

The encoding rule of the predicted residuals may be preset, with each predicted residual corresponding to a unique code. Exemplarily, the encoding rule of the predicted residuals may refer to the SVO-VLC code table. In the last bit of the code, 0 indicates that the predicted residual is positive and 1 indicates that the predicted residual is negative. For example, when a residual group is (1, −2), the maximum absolute value of the predicted residuals is 2, then code in the "2-3" column is used. A predicted residual 1 corresponds to code 010 and a predicted residual 2 corresponds to code 101, the residual group corresponds to code (010, 101).

In some embodiments, the processor may, in response to determining that the predicted residuals of the residual group are all first predetermined values, output the code of the header; or in response to determining that a maximum value of the predicted residuals of the residual group is greater than a second predetermined value, directly output an original pixel value corresponding to the residual group.

In some embodiments, the first predetermined value is a set value of the predicted residuals. Exemplarily, as shown in the SVO-VLC code table, the first predetermined value may be set to 0, i.e., when the predicted residuals of a residual group are all 0, the code 01 of the header is output.

The second predetermined value refers to a threshold of the maximum absolute value of the predicted residuals. Exemplarily, as shown in the SVO-VLC code table, the second predetermined value may be 31, i.e., when the maximum absolute value of the predicted residuals of a residual group is greater than 31, the original pixel value corresponding to the residual group is directly output.

In 740, residual streams of all input image blocks of all processing channels are stored in a storage file as a compressed file.

In some embodiments, the compressed file may be in a ZIP format, a RAR format, or the like. The compressed file may achieve full data recovery based on a residual encoding stream, indicating that the compression of the input image block is lossless.

A special encoding is performed by setting the first predetermined value and the second predetermined value to simplify the input codes and improve compression efficiency when all the predicted residuals of the residual group are 0. When the predicted residuals of the residuals group are relatively large as a whole, it indicates that there is a significant error in the predicted pixel value, then the original pixel value is output to ensure that the image is accurate and is not distorted.

In some embodiments, determining at least one input image block based on the input image includes determining, based on the input image, whether a first edge feature exists; in response to the existence of the first edge feature, determining the at least one input image block based on the first edge feature; in response to the absence of the first edge feature, determining a first image feature based on the input image, and determining the at least one input image block based on the first image feature.

The first edge feature refers to an edge feature of the full channel image of the input image. The edge feature is a region of the image that is significantly varied and represents a significant change in the boundary, structure, or texture of an object in the input image. For example, the first edge feature includes discontinuities in the distribution of an image characteristic (e.g., a pixel grayscale, a color, a texture, etc.) in the input image and/or a collection of pixels with a step change or a ridge-like change in the image characteristic.

In some embodiments, the processor may determine whether the first edge feature exists based on the input image by an edge detection algorithm. The edge detection algorithm may be at least one of a Canny operator, a LOG operator, a Roberts edge detection operator, or other edge detection algorithms.

In some embodiments, the processor may determine at least one input image block based on the first edge feature in response to the existence of the first edge feature through a variety of manners. For example, the processor may designate a consecutive part of the first edge feature as a closed edge, with pixels contained within each closed edge divided into one input image block.

The first image feature refers to a feature of each pixel in the full channel image. For example, a brightness, a color value, etc., of the pixel.

In some embodiments, the processor may, in response to the absence of the first edge feature, determine the first image feature based on the input image and determine the at least one input image block based on the first image feature through a variety of manners.

For example, the processor may extract the brightness, the color value, or the like of each pixel in the input image as the first image feature of the input image. The processor may designate a pixel having a similarity greater than a preset threshold and a consecutive plurality of pixels as an input image block based on a similarity of first image features of two adjacent pixels in the input image. The processor may construct a feature vector based on at least one of the brightness and the color value of each input image, and determine the similarity based on a vector distance between the feature vectors of the two adjacent pixels. The similarity is negatively correlated with the vector distance. The preset threshold may be set empirically. For example, the processor may use a statistical value of the similarity corresponding to all pairs of adjacent pixels in the input image as the preset threshold. Exemplarily, the statistical value may be an average value, or the like.

Pixel values in an image typically have strong correlation over a small local range, i.e., spatially neighboring pixels tend to have similar color or brightness. Chunking based on the first edge feature and the first image feature may more efficiently utilize the local correlation for more efficient compression of the input image.

It should be noted that the foregoing description of the process 700 is intended to be exemplary and illustrative only and does not limit the scope of application of the present disclosure. For those skilled in the art, various corrections and changes may be made to the process 700 under the guidance of the present disclosure. However, these corrections and changes remain within the scope of the present disclosure.

In some embodiments, determining the at least one input image block based on the input image includes determining, for each processing channel, based on the input image and the processing channel, whether a second edge feature exists; in response to the existence of the second edge feature, determining, based on the second edge feature, at least one input image block; in response to the absence of the second edge feature, determining, based on the input image and the processing channel, the second image feature pf the processing channel; and determining the at least one input image block based on second image features of all processing channels.

The second edge feature refers to an edge feature of a single-channel image of the input image. The single-channel image refers to an input image with only one processing channel turned on. In some embodiments, the processor may sequentially enable one of the processing channels for the input image and block the other processing channels to obtain the single-channel image of the input image. Descriptions regarding the edge features may be found in related descriptions hereinabove.

In some embodiments, for each processing channel, the processor may, based on the single-channel image of the input image, determine whether the second edge feature exists by the edge detection algorithm. In response to the existence of the second edge feature, the processor may designate a consecutive part in the second edge feature as a closed edge, where pixels contained within each closed edge are divided into the input image block. The manner for determining the second edge feature is similar to the manner for determining the first edge feature, more detailed descriptions may be found in related descriptions hereinabove.

The second image feature refers to a feature of each pixel in the single-channel image. For example, a brightness, a color value, or the like, of a pixel.

In some embodiments, the processor may determine the second image feature based on the input image in response to the absence of the second edge feature and determine the at least one input image block based on the second image feature through a variety of manners.

For example, for each processing channel, the processor may extract the brightness, the color value, or the like, of each pixel in the input image under the processing channel as the second image feature of the input image. The processor may designate a plurality of pixels whose similarity is greater than a preset threshold and are consecutive as an input image block under the processing channel based on the similarity of the first image feature of two adjacent pixels in the input image. The specific manner is similar to the manner for determining the input image block based on the first image feature, and more detailed descriptions may be found in the related descriptions hereinabove.

Each processing channel is independently predicted and encoded. Image cutting based on the features of the single-channel image of the input image may more effectively utilize the local correlation of the single-channel image of the input image and may perform efficient compression for each processing channel.

In some embodiments, obtaining the predicted value of the input image block under the current processing channel based on the input image block under the current processing channel by the intra-block prediction includes determining, based on a first pixel value sequence of the input image block, a second pixel value of the input image block.

The second pixel value refers to a predicted value of a pixel of the input image block currently predicted.

The first pixel value refers to an original pixel value of a pixel located within a predetermined range of the second pixel value. The first pixel value sequence refers to a sequence consisting of actual pixel values located within the predetermined range of the second pixel value. The first pixel value sequence does not include the original pixel value of the pixel where the second pixel value is located. More detailed descriptions regarding the original pixel value may be found in FIG. 7 and related descriptions thereof.

The predetermined range maybe preset according to the demand or experience. Using a smaller predetermined range may not be able to represent the features of the input image block, and adopting a larger predetermined range may increase the complexity of the calculation. Based on the principle of guaranteeing the features of the input image block, a smaller range should be used as much as possible. If the second pixel value is located at the edge of the input image block and the predetermined range is beyond the input image block, the excess may be supplemented by 0.

Exemplarily, the predetermined range may be 3*3, and the processor may take a sequence of actual pixel values excluding the second pixel value within the 3*3 range, centered on the pixel corresponding to the second pixel value, as the first pixel value sequence.

In some embodiments, the processor may determine the second pixel value of the input image block based on the first pixel value sequence of the input image block through a variety of manners. For example, the processor may use a statistic value of the first pixel value sequence as the second pixel value. Exemplarily, the statistic value may be an average, or the like.

The first pixel value sequence contains pixel information near the second pixel value. Determining the second pixel value by the first pixel value sequence may fully utilize the information of the surrounding pixel values to make the predicted value of the input image block more accurate.

Figure 8:
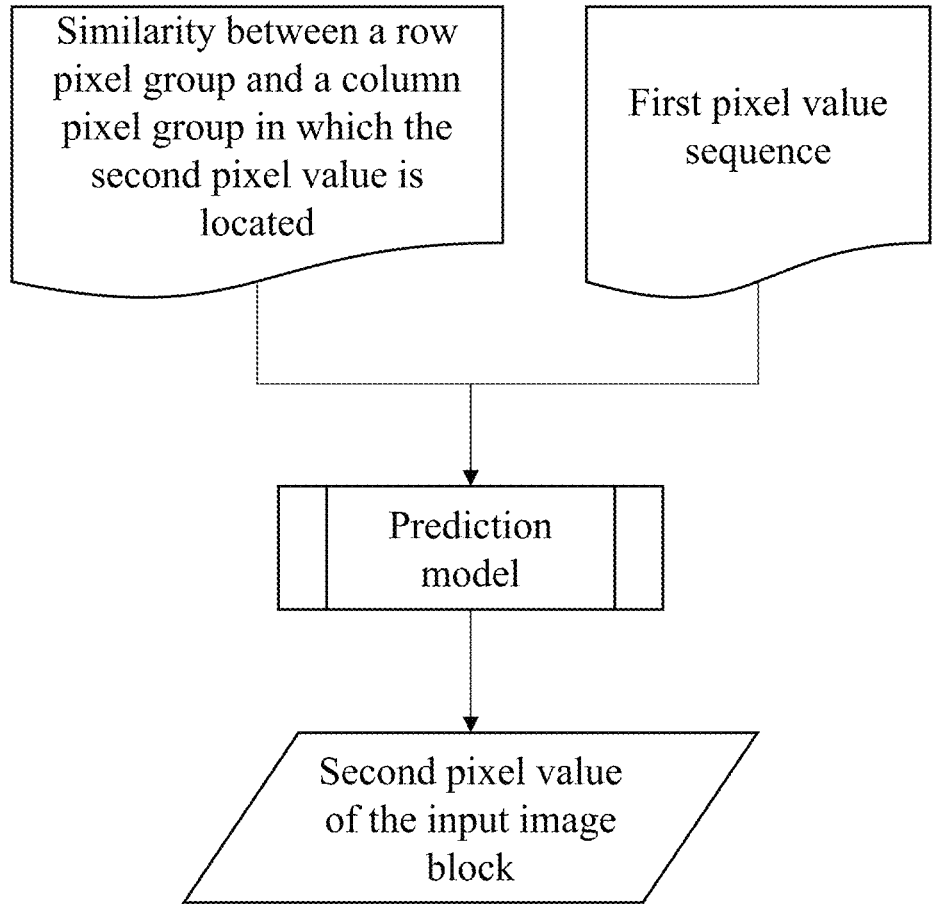
FIG. 8 is a schematic diagram illustrating an exemplary prediction model according to some embodiments of the present disclosure.

FIG. 8 is a schematic diagram illustrating an exemplary prediction model according to some embodiments of the present disclosure.

In some embodiments, as shown in FIG. 8, determining a second pixel value of the input image block based on a first pixel value sequence of the input image block includes determining, based on a similarity between a row pixel group and a column pixel group in which the second pixel value is located and the first pixel value sequence, each second pixel value of the input image block by a prediction model.

The row pixel group in which the second pixel value is located refers to a group of pixel values in a row in which the second pixel value is located. The column pixel group in which the second pixel value is located refers to a group of pixel values in a column in which the second pixel value is located. More detailed descriptions regarding determining the similarity between the row pixel group and the column pixel group may be found in FIG. 7 and related descriptions thereof.

The prediction model refers to a model for predicting the second pixel value. In some embodiments, the prediction model is a machine learning model. For example, the prediction model may be at least one of a graphic neural network (GNN) model, a convolutional neural network (CNN) model, a deep neural network (DNN) model, or other models.

In some embodiments, the prediction model may be obtained by training a training set. The training set includes a large count of training samples and training labels corresponding to the training samples. More detailed descriptions regarding the training set may be found in related descriptions hereinafter.

Each set of training samples in the training set may include a sample similarity between a row pixel group and a column pixel group in which a sample second pixel value is located and a sample first pixel value sequence in a sample input image block. The sample input image block may be obtained from an existing sample image database, and the sample image database may be constructed based on historical data. The training labels corresponding to the training samples are original pixel values corresponding to each set of training samples. More detailed descriptions regarding the manner for obtaining the original pixel value may be found in FIG. 7 and related descriptions hereinafter.

In some embodiments, the processor may obtain the plurality of training samples with training labels as the training set based on a sample image database, perform a plurality of rounds of iterations based on the training set, and end the iteration when an iteration condition is satisfied to obtain a trained prediction model. Each round of iteration includes selecting at least one training sample from the training set to input into the prediction model, obtaining a model prediction output corresponding to the at least one training sample; based on the model prediction output and a training label corresponding to at least one training sample, calculating a value of the loss function by substituting into a predefined loss function; and based on the value of the loss function, inversely updating a model parameter in the prediction model. A gradient descent algorithm, etc., may be used for inversely updating. The iteration condition may be that the loss function converges, a count of iterations reaches a threshold, or the like.

Predicting the second pixel value by the prediction model is robust to noise, missing data, or image distortion, and is capable of accurately predicting the pixel value under different conditions, which improves the prediction accuracy of complex patterns. Meanwhile, Predicting the second pixel value by the prediction model reduces manual intervention and improves computational efficiency.

In some embodiments, the training of the prediction model includes at least training based on the training set, validating based on a validation set, and testing based on a test set. The training set, the test set, and the validation set include the sample similarity of the row pixel group and the column pixel group in which the sample second pixel value is located, and the sample first pixel value sequence in the sample input image. An amount of data in the training set, the test set, and the validation set is a preset ratio, and there is no data crossover in the training set, the test set, and the validation set. Different training samples of the prediction model has different learning rate and the learning rate of the training sample correlate to the image complexity of the sample input image block corresponding to the training sample.

The training set refers to a dataset used for training the prediction model. More detailed descriptions regarding the training set and training based on the training set may be found in related descriptions hereinabove.

The validation set refers to a dataset used to validate a trained prediction model. The validation set validates a state of the prediction model. For example, the validation set may be used to monitor whether overfitting occurs during the training of the prediction model and stop training if overfitting occurs.

The test set refers to a dataset used to test the validated prediction model. The test set is used to evaluate a generalization ability of the prediction model.

The preset ratio may be preset empirically. Exemplarily, the preset ratio may be 8:1:1, or the like.

No data crossover means that the same piece of data exists only in one of the training set, the test set, or the validation set. It also means that data that has already been extracted in the historical data is no longer extracted.

The learning rate refers to a step size in updating the weights at each iteration during the training process of the prediction model. The learning rate may determine the magnitude of each weight is updated in the gradient direction. The training may be unstable if the learning rate is set too large, or the training may be very slow if the learning rate is set too small. By setting appropriate learning rates for different training samples, the neural network may converge quickly to obtain the optimal solution, thus improving the accuracy of the prediction model obtained from training.

In some embodiments, the processor may determine the learning rate of the training sample based on the image complexity of the sample input image block corresponding to the training sample in a variety of methods. More detailed descriptions regarding the image complexity may be found in FIG. 7 and the related descriptions thereof.

For example, the processor may calculate the learning rate of the training sample based on the image complexity of the sample input image block. The learning rate is positively correlated with the image complexity of the sample input image block. The higher the image complexity, the greater the difference in pixel values within various processing channels of the sample input image block, and the less predictable the pixel values. Therefore, when learning a sample with high image complexity, the implicit laws are more important, and the learning rate may be increased. The lower the image complexity, the simpler the image, and the easier the lossless compression, so the learning rate may be appropriately reduced.

The training, validation, and testing of the prediction model may be used to assess the stability and generalization ability of the model more comprehensively, as well as to reduce the risk of overfitting in the training process of the prediction model, thus improving the reliability of the model in practical applications.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and amendments are intended to be suggested by this disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment", "one embodiment", or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations, therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about", "approximate", or "substantially". For example, "about", "approximate", or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for lossless ARGB (Alpha, Red, Green, Blue) compression based on an intra-block prediction, wherein the method is executed by a processor, and the method comprises:

for an input image block under a processing channel, executing the following operations until all input image blocks are encoded:

obtaining a predicted value of the input image block under a current processing channel based on the input image block under the current processing channel by the intra-block prediction, wherein the intra-block prediction includes a prediction by dividing the input image block into three parts, and the prediction by dividing the input image block into the three parts includes:

determining a similarity set, wherein the similarity set includes similarities of at least one row pixel group and at least one column pixel group of the input image block, and labels corresponding to the similarities; and dividing the input image block into the three parts based on the similarity set, including:

selecting a row and column of the input image block that have the highest similarity in the similarity set, taking intersection pixels as a first part, taking the remaining pixels in the same row and column as a second part, and taking pixels in the input image block excluding the first part and the second part as a third part;

determining predicted residuals of the input image block under the current processing channel based on the predicted value and an original pixel value;

inputting the predicted residuals into a residual encoder for encoding to obtain a residual stream of the input image block under the current processing channel, wherein the residual encoder is a processor including a predetermined encoding program; and storing residual streams of all input image blocks of all processing channels as a compressed file in a storage file.

2. The method of claim 1, wherein the input image block is determined based on an input image, the input image is an ARGB image, and the input image block is obtained by dividing the ARGB image into 8*8 sized image blocks.

3. The method of claim 1, comprising:

performing a differential pulse code modulation (DPCM) prediction on a first row and a first column of the input image block; and performing a median edge detector (MED) prediction on a region of the input image block after removing the first row and the first column.

4. The method of claim 1, comprising:

obtaining at least one residual group by grouping the predicted residuals based on a predetermined condition.

5. The method of claim 4, wherein, for the same residual group, a header of the residual group is determined based on a maximum absolute value of the at least one residual group.

6. The method of claim 5, comprising:

in response to determining that the predicted residuals of the at least one residual group are all first predetermined values, encoding the header; or in response to determining that a maximum value of the predicted residuals of the at least one residual group is greater than a second predetermined value, directly outputting an original pixel value corresponding to the encoding unit.

7. The method of claim 1, wherein determining at least one input image block based on the input image includes:

determining, based on the input image, whether a first edge feature exists;

in response to existence of the first edge feature, determining the at least one input image block based on the first edge feature; and in response to an absence of the first edge feature, determining a first image feature based on the input image, and determining the at least one input image block based on the first image feature.

8. The method of claim 1, wherein determining at least one input image block based on the input image includes:

determining, for each processing channel, based on the input image and the processing channel, whether a second edge feature exists;

in response to existence of the second edge feature, determining, based on the second edge feature, the at least one input image block;

in response to an absence of the second edge feature, determining, based on the input image and the processing channel, a second image feature of the processing channel; and determining the at least one input image block based on second image features of all processing channels.

9. The method of claim 1, wherein obtaining the predicted value of the input image block under the current processing channel based on the input image block under the current processing channel by the intra-block prediction further includes:

determining a second pixel value of the input image block based on a first pixel value sequence of the input image block, wherein the first pixel value sequence refers to a sequence consisting of actual pixel values that lie within a predetermined range of the second pixel value, the second pixel value refers to a predicted value of a pixel of the input image block currently predicted.

10. The method of claim 9, wherein the determining the second pixel value of the input image block based on the first pixel value sequence of the input image block includes:

determining, based on a similarity between a row pixel group and a column pixel group in which the second pixel value is located and the first pixel value sequence, each second pixel value of the input image block by a prediction model.

11. The method of claim 10, wherein a training of the prediction model includes at least training based on a training set, validating based on a validation set, and testing based on a test set;

the training set, the test set, and the validation set include a sample similarity of the row pixel group and the column pixel group in which a sample second pixel value is located, and a sample first pixel value sequence in a sample input image;

an amount of data in the training set, the test set, and the validation set is a preset ratio;

there is no data crossover in the training set, the test set, and the validation set; and different training samples of the prediction model have different learning rate, and a learning rate of a training sample correlates to an image complexity of a sample input image block corresponding to the training sample.

* * * * *